(12) United States Patent
Kuk et al.

(10) Patent No.: US 12,459,844 B2
(45) Date of Patent: Nov. 4, 2025

(54) ULTRAPURE WATER SUPPLYING APPARATUS, SUBSTRATE PROCESSING SYSTEM INCLUDING THE SAME, AND PROCESSING SUBSTRATE METHOD USING THE SAME

(71) Applicant: Samsung Electronics Co., Ltd., Suwon-si (KR)

(72) Inventors: Dongcheol Kuk, Seoul (KR); Juhui Park, Hwaseong-si (KR); Seyoon Kim, Hwaseong-si (KR); Jiyeon Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 504 days.

(21) Appl. No.: 17/940,580

(22) Filed: Sep. 8, 2022

(65) Prior Publication Data

US 2023/0278900 A1   Sep. 7, 2023

(30) Foreign Application Priority Data

Mar. 4, 2022   (KR) .......................... 10-2022-0027913

(51) Int. Cl.
*C02F 9/00*   (2023.01)
*C02F 1/00*   (2023.01)
(Continued)

(52) U.S. Cl.
CPC ................ *C02F 9/00* (2013.01); *C02F 1/001* (2013.01); *C02F 1/42* (2013.01); *C02F 1/441* (2013.01);
(Continued)

(58) Field of Classification Search
CPC .... C02F 9/00; C02F 1/001; C02F 1/42; C02F 1/441; C02F 2103/04; C02F 2209/03;
(Continued)

(56) References Cited

U.S. PATENT DOCUMENTS 5,024,766 A * 6/1991 Mahmud ................. C02F 1/325
                                                    210/806
5,061,374 A * 10/1991 Lewis ................... B01D 61/026
                                                    210/686
(Continued)

FOREIGN PATENT DOCUMENTS

JP        2022017035 A    1/2022
KR  10-2003-0067114 A    8/2003
(Continued)

OTHER PUBLICATIONS

Machine translation of WO2022014221A1 ('Ichihara') (Year: 2022).*

*Primary Examiner* — Bobby Ramdhanie
*Assistant Examiner* — Boi-Lien Thi Nguyen
(74) *Attorney, Agent, or Firm* — Muir Patent Law, PLLC (57) ABSTRACT

An ultrapure water supplying apparatus may include an activated carbon filtering device, an ion exchange resin device connected to the activated carbon filtering device, a reverse osmotic membrane device connected to the ion exchange resin device, a hollow fiber membrane device connected to the reverse osmotic membrane device, a first fluid driving part between the reverse osmotic membrane device and the hollow fiber membrane device, and a control unit configured to control the first fluid driving part. The first fluid driving part may include first, second, and third pumps, which are connected in parallel to the reverse osmotic membrane device, and a pressure sensor located between the first pump and the hollow fiber membrane device. The control unit may be configured to control each of the first, second, and third pumps, based on a signal transmitted from the pressure sensor.

20 Claims, 9 Drawing Sheets

(51) Int. Cl.
*C02F 1/42* (2023.01)
*C02F 1/44* (2023.01)
*C02F 103/04* (2006.01)

(52) U.S. Cl.
CPC ...... *C02F 2103/04* (2013.01); *C02F 2209/03* (2013.01)

(58) Field of Classification Search
CPC .. C02F 9/20; C02F 1/008; C02F 1/283; C02F 1/44; C02F 2103/346; C02F 2209/40; Y02A 20/131; B01D 63/02; H01L 21/67017
See application file for complete search history.

(56) References Cited

U.S. PATENT DOCUMENTS

| | | | |
|---|---|---|---|
| 5,512,178 A * | 4/1996 | Dempo | C02F 1/78 |
| | | | 210/182 |
| 6,174,437 B1 * | 1/2001 | Haney | B01D 61/025 |
| | | | 210/257.2 |
| 8,480,906 B2 | 7/2013 | Kobayashi | |
| 8,845,888 B2 * | 9/2014 | Manabe | C02F 1/42 |
| | | | 210/90 |
| 11,072,545 B2 | 7/2021 | Eliosov et al. | |
| 2004/0182764 A1 * | 9/2004 | Furukawa | C02F 9/00 |
| | | | 210/257.2 |
| 2018/0221825 A1 | 8/2018 | Imamura et al. | |
| 2019/0270653 A1 * | 9/2019 | Amaya | B01D 61/58 |
| 2021/0078873 A1 | 3/2021 | Takatori et al. | |
| 2021/0246050 A1 * | 8/2021 | Tsutano | B01J 47/022 |

FOREIGN PATENT DOCUMENTS

| | | | | |
|---|---|---|---|---|
| KR | 100431512 B1 | 5/2004 | | |
| KR | 200426270 Y1 | 9/2006 | | |
| KR | 10-2008-0014248 A | 2/2008 | | |
| KR | 100826294 B1 | 4/2008 | | |
| KR | 100987646 B1 | 10/2010 | | |
| KR | 101390441 B1 | 4/2014 | | |
| KR | 10-2021-0018207 A | 2/2021 | | |
| WO | WO-2020085984 A1 * | 4/2020 | | C02F 1/006 |
| WO | WO-2022014221 A1 * | 1/2022 | | B01D 61/146 |

* cited by examiner

ULTRAPURE WATER SUPPLYING APPARATUS, SUBSTRATE PROCESSING SYSTEM INCLUDING THE SAME, AND PROCESSING SUBSTRATE METHOD USING THE SAME

CROSS-REFERENCE TO RELATED APPLICATIONS

This U.S. non-provisional patent application claims priority under 35 U.S.C. § 119 to Korean Patent Application No. 10-2022-0027913, filed on Mar. 4, 2022, in the Korean Intellectual Property Office, the entire contents of which are hereby incorporated by reference.

BACKGROUND OF THE INVENTION

The present disclosure relates to an ultrapure water supplying apparatus, a substrate processing system including the same, and a substrate processing method using the same, and in particular, to an ultrapure water supplying apparatus having a back-up function of preparing for an unintended drop of pressure, a substrate processing system including the same, and a substrate processing method using the same.

A semiconductor device is fabricated through various processes. For example, the fabrication of the semiconductor device may include a photolithography process, an etching process, a deposition process, a polishing process, and a cleaning process, which are performed on a wafer (e.g., a silicon wafer). At least one of these processes may include a step that is performed using ultrapure water (UPW). The ultrapure water has a low electric conductivity and an extremely low impurity concentration. The ultrapure water may be produced through a specific process. It is necessary to control a flow rate of the ultrapure water, which is supplied into a substrate processing device during the process, within a desired range.

SUMMARY

An embodiment of the inventive concept provides an ultrapure water supplying apparatus, which is configured to stably supply ultrapure water at a specific flow rate or higher (e.g., within a specific range of flow rate), a substrate processing system including the same, and a substrate processing method using the same.

An embodiment of the inventive concept provides an ultrapure water supplying apparatus, which is configured to prepare for and/or solve technical issues which may occur when at least one of pumps malfunctions, a substrate processing system including the same, and a substrate processing method using the same.

An embodiment of the inventive concept provides an ultrapure water supplying apparatus, which is configured to prepare for and/or solve technical issues which may occur when a power supplying part malfunctions, a substrate processing system including the same, and a substrate processing method using the same.

According to an embodiment of the inventive concept, an ultrapure water supplying apparatus may include an activated carbon filtering device, an ion exchange resin device connected to the activated carbon filtering device, a reverse osmotic membrane device connected to the ion exchange resin device, a hollow fiber membrane device connected to the reverse osmotic membrane device, a first fluid driving part between the reverse osmotic membrane device and the hollow fiber membrane device, and a control unit configured to control the first fluid driving part. The first fluid driving part may include a first pump connected to the reverse osmotic membrane device, a second pump connected to the reverse osmotic membrane device and disposed in parallel to the first pump, a third pump connected to the reverse osmotic membrane device and disposed in parallel to each of the first and second pumps, and a pressure sensor located between the first pump and the hollow fiber membrane device. The control unit may be configured to control each of the first, second, and third pumps, based on a signal transmitted from the pressure sensor.

According to an embodiment of the inventive concept, a substrate processing system may include a substrate processing device, and an ultrapure water supplying apparatus configured to supply ultrapure water to the substrate processing device. The ultrapure water supplying apparatus may include a first filtering device, a second filtering device connected to the first filtering device, a fluid driving part between the first and second filtering devices, a first power supplying part connected to the fluid driving part, and a second power supplying part connected to the fluid driving part and separated from the first power supplying part. The fluid driving part may include a first pump connected to the first filtering device to receive an electric power from the first power supplying part, a second pump connected to the first filtering device to receive an electric power from the second power supplying part, the first and second pumps being disposed in parallel, and a pressure sensor located between the first pump and the second filtering device.

According to an embodiment of the inventive concept, a substrate processing method may include supplying ultrapure water to a substrate processing device using an ultrapure water supplying apparatus and processing a substrate in the substrate processing device using the ultrapure water. The supplying of the ultrapure water to the substrate processing device using the ultrapure water supplying apparatus may include controlling a fluid driving part under control of a control unit such that a fluid passes through an activated carbon filtering device, an ion exchange resin device, a reverse osmotic membrane device, and a hollow fiber membrane device of the ultrapure water supplying apparatus sequentially. The fluid driving part may include a plurality of pumps, which are arranged in parallel between the reverse osmotic membrane device and the hollow fiber membrane device, and a pressure sensor located between the pumps and the hollow fiber membrane device. The controlling of the fluid driving part may include controlling each of the pumps, based on a signal transmitted from the pressure sensor to the control unit.

DETAILED DESCRIPTION

Example embodiments of the inventive concepts will now be described more fully with reference to the accompanying drawings, in which example embodiments are shown.

Figure 1:
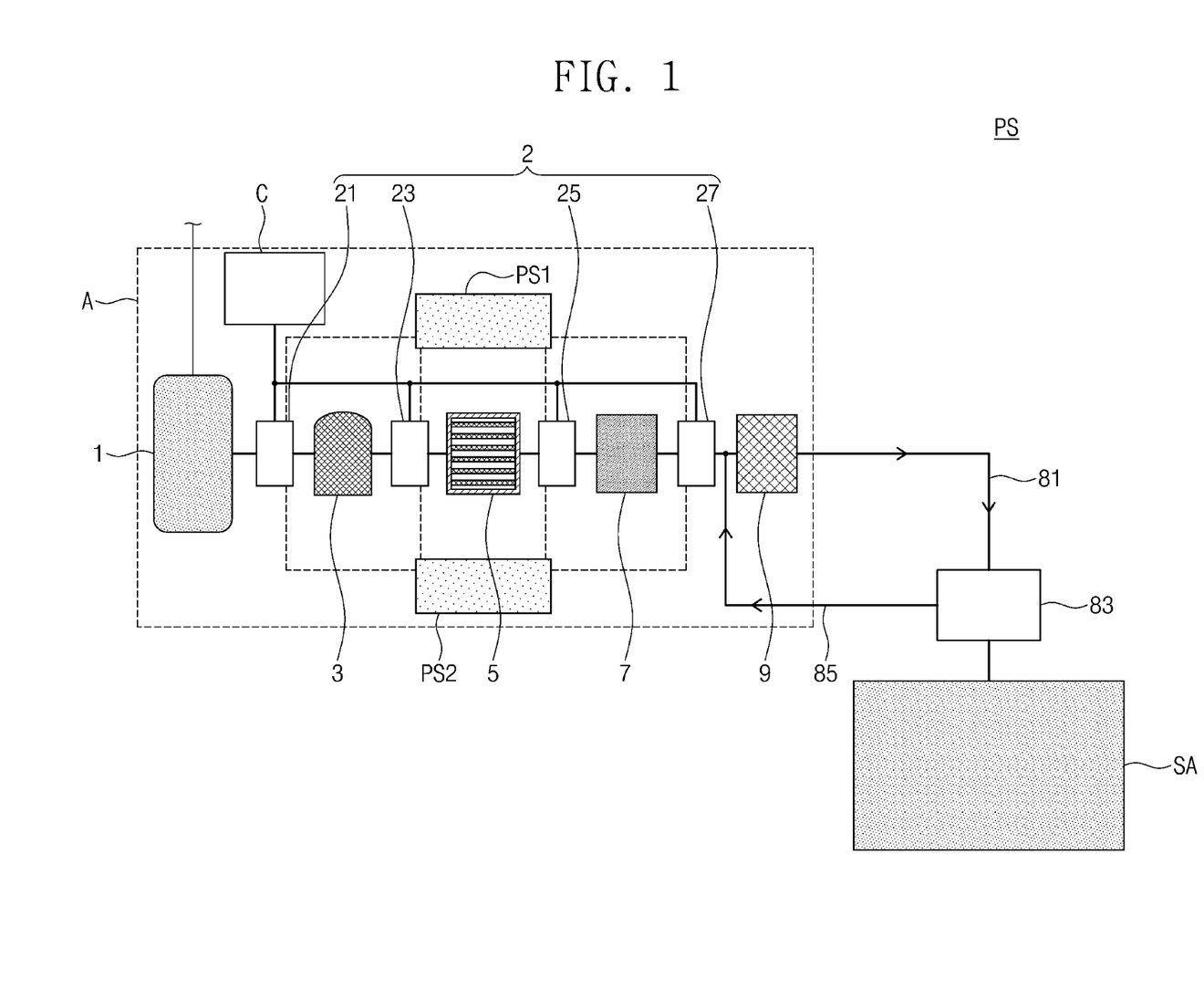
FIG. 1 is a diagram illustrating a substrate processing system according to an embodiment of the inventive concept.

FIG. 1 is a diagram illustrating a substrate processing system according to an embodiment of the inventive concept.

Referring to FIG. 1, a substrate processing system PS may be provided. The substrate processing system PS may be configured to perform a specific process, which is one of fabrication processes of a semiconductor device, on a substrate. For example, the substrate processing system PS may be configured to perform a cleaning process and/or a polishing process on the substrate. In an embodiment, the substrate may be a silicon wafer, but the inventive concept is not limited to this example. The substrate processing system PS may include an ultrapure water supplying apparatus A, a substrate processing device SA, a supply conduit 81, a flow control device 83, and a collecting conduit 85.

The ultrapure water supplying apparatus A may be configured to produce and supply ultrapure water (UPW). The ultrapure water may be a kind of water that is prepared to have a low electric conductivity and an extremely low impurity concentration. For example, the ultrapure water may be de-ionized water (DIW). For example, the impurity may include ions (e.g., cations and/or anions), chlorine, organic materials, bacteria, and/or other particles. The ultrapure water supplying apparatus A may be connected to the substrate processing device SA. The ultrapure water, which is produced by the ultrapure water supplying apparatus A, may be supplied to the substrate processing device SA. The ultrapure water supplying apparatus A will be described in more detail with reference to FIG. 2.

The substrate processing device SA may be configured to perform a specific process on the substrate. For example, the substrate processing device SA may be configured to perform a cleaning process and/or a polishing process on the substrate. For example, the substrate processing device SA may be a cleaning apparatus and/or a polishing apparatus. To perform the process on the substrate, it may be necessary to supply the ultrapure water to the substrate processing device SA. Such ultrapure water may be supplied to the substrate processing device SA from the ultrapure water supplying apparatus A. The substrate processing device SA will be described in more detail with reference to FIGS. 4 and 5.

The supply conduit 81 may connect the ultrapure water supplying apparatus A to the substrate processing device SA. The ultrapure water, which is produced in the ultrapure water supplying apparatus A, may be supplied to the substrate processing device SA through the supply conduit 81.

The flow control device 83 may be placed on the supply conduit 81. The flow control device 83 may be configured to control a flow rate of a fluid flowing through the supply conduit 81. For example, the flow control device 83 may be configured to supply the ultrapure water in the supply conduit 81 to the substrate processing device SA at a flow rate that is required for the process in the substrate processing device SA. For this, the flow control device 83 may include a liquid flow controller (LFC), but the inventive concept is not limited to this example.

The collecting conduit 85 may connect the flow control device 83 to the ultrapure water supplying apparatus A. The collecting conduit 85 may be a separate conduit distinct from the supply conduit 81. For example, the collecting conduit 85 and the supply conduit 81 may be connected in parallel to the ultrapure water supplying apparatus A. A fraction of the ultrapure water, which is supplied from the supply conduit 81 but is not required by the substrate processing device SA, may be returned to the ultrapure water supplying apparatus A through the collecting conduit 85. This may be beneficial to precisely supply the ultrapure water to the substrate processing device SA at a desired flow rate.

Figure 2:
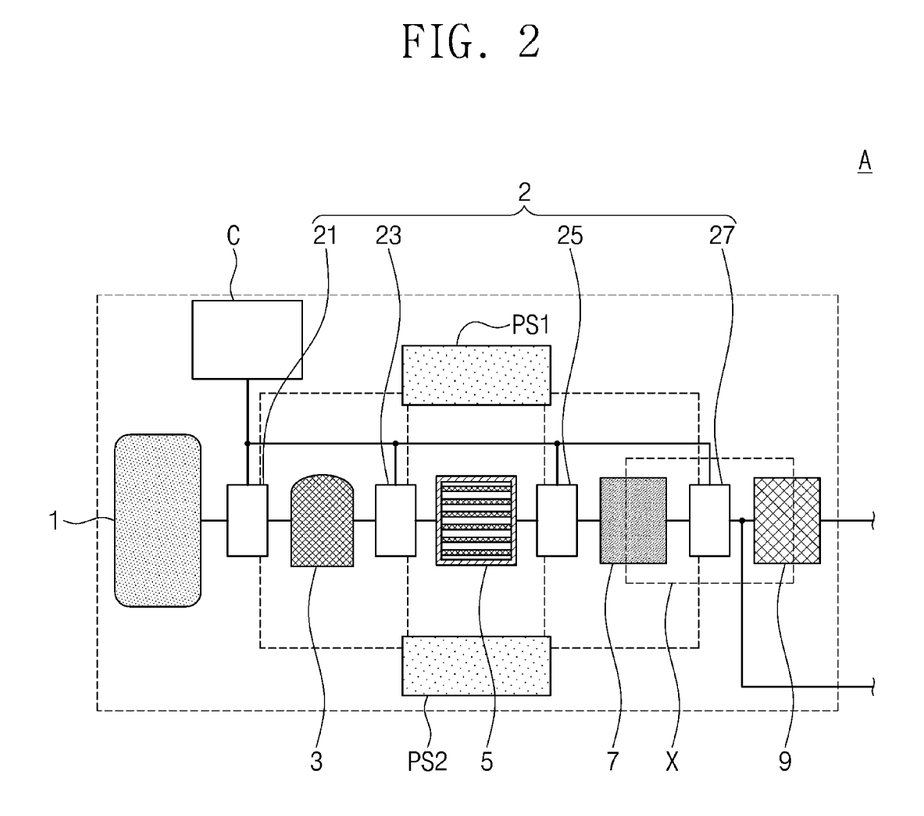
FIG. 2 is a diagram illustrating an ultrapure water supplying apparatus according to an embodiment of the inventive concept.

FIG. 2 is a diagram illustrating an ultrapure water supplying apparatus according to an embodiment of the inventive concept.

Referring to FIG. 2, the ultrapure water supplying apparatus A may include a supply tank 1, a plurality of filtering devices, a fluid driving part 2, a control unit C, a first power supplying part PS1, and a second power supplying part PS2.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

The supply tank 1 may contain a fluid that is used to produce the ultrapure water. In an embodiment, the fluid may include water. The supply tank 1 may be connected to the outside and may receive the fluid from the outside. The fluid may be stored in the supply tank 1 for a while and then may be sent to the filtering devices.

The filtering devices may be connected to the supply tank 1. Each of the filtering devices may be configured to remove impurities from the fluid. The fluid, which has passed through the filtering devices, may be used as the ultrapure water. For example, in the fluid, which has passed through the filtering devices, a density of particles having a diameter of 0.1 μm or smaller may be less than or equal to 20 ea/cm$^3$. The filtering devices may be connected in series to each other. For example, the filtering devices may be arranged such that the fluid passes through the filtering devices sequentially. In an embodiment, four filtering devices may be provided. The four filtering device may be a first filtering device 3, a second filtering device 5, a third filtering device 7, and a fourth filtering device 9. Each filtering device may include or may be one of an activated carbon filtering device, an ion exchange resin device, a reverse osmotic membrane device, a hollow fiber membrane device, a polisher, a membrane degasifier (MDG), a vacuum degasifier (VDG), a continuous electrodeionization (CEDI), a heat exchanger, or a filter having particles of different sizes. Hereinafter, for convenience in description, the first filtering device 3 may be referred to as an activated carbon filtering device 3. In addition, the second filtering device 5 may be referred to as an ion exchange resin device 5. The third filtering device 7 may be referred to as a reverse osmotic membrane device 7. The fourth filtering device 9 may be referred to as a hollow fiber membrane device 9. For example, the first filtering device 3 may be an activated carbon filtering device, the second filtering device 5 may be an ion exchange resin device, the third filtering device 7 may be a reverse osmotic membrane device, and the fourth filtering device 9 may be a hollow fiber membrane device.

In the activated carbon filtering device 3, a filtering operation using activated carbon may be performed on the fluid. For this, the activated carbon filtering device 3 may include the activated carbon. The activated carbon filtering device 3 may be connected to the supply tank 1. The fluid, which is supplied from the supply tank 1, may be filtered while passing through the activated carbon filtering device 3. For example, chlorine and/or organic material in the fluid may be removed in an adsorption manner, while the fluid passes through the activated carbon filtering device 3.

In the ion exchange resin device 5, an ion exchange resin may be used to remove ions from the fluid. For this, the ion exchange resin device 5 may include a cation exchange resin and/or an anion exchange resin. The cation exchange resin and the anion exchange resin may be alternately disposed in the ion exchange resin device 5. In addition, the ion exchange resin device 5 may further include an electrode that is used to apply a DC voltage. The ion exchange resin device 5 may be connected to the activated carbon filtering device 3. The fluid, which has passed through the activated carbon filtering device 3, may be filtered while passing through the ion exchange resin device 5. For example, ions in the fluid may be removed by the ion exchange resin device 5.

In the reverse osmotic membrane device 7, a reverse osmotic phenomenon may be used to perform a filtering operation of the fluid. For this, the reverse osmotic membrane device 7 may include a reverse osmotic membrane. The reverse osmotic membrane device 7 may be connected to the ion exchange resin device 5. The fluid, which has passed through the ion exchange resin device 5, may be filtered while passing through the reverse osmotic membrane device 7. For example, ions and/or particles in the fluid may be removed by the reverse osmotic membrane device 7.

In the hollow fiber membrane device 9, a filtering operation using a hollow fiber membrane may be performed on the fluid. For this, the hollow fiber membrane device 9 may include a hollow fiber membrane. The hollow fiber membrane device 9 may be connected to the reverse osmotic membrane device 7. The fluid, which has passed through the reverse osmotic membrane device 7, may be filtered while passing through the hollow fiber membrane device 9. For example, bacteria and/or particles in the fluid may be removed by the hollow fiber membrane device 9. The fluid, which has passed through the hollow fiber membrane device 9, may be supplied to the substrate processing device SA (e.g., see FIG. 1).

The above description has referred to an example in which the activated carbon filtering device 3, the ion exchange resin device 5, the reverse osmotic membrane device 7, and the hollow fiber membrane device 9 are sequentially disposed, but the inventive concept is not limited to this example. For example, the disposition or arrangement of the activated carbon filtering device 3, the ion exchange resin device 5, the reverse osmotic membrane device 7, and the hollow fiber membrane device 9 may be changed depending on the details of the applied design.

The fluid driving part 2 may be configured to move the fluid. For example, the fluid driving part 2 may exert/provide a driving force on the fluid. The fluid in the supply tank 1 may pass through the filtering devices by the driving force provided from the fluid driving part 2. In addition, the fluid may be supplied from the ultrapure water supplying apparatus A to the substrate processing device SA (e.g., see FIG. 1) by the fluid driving part 2. In an embodiment, a plurality of fluid driving parts 2 may be provided. The fluid driving parts 2 may be arranged in series to each other. For example, four fluid driving parts 2 may be provided. The four fluid driving parts 2 may be a first fluid driving part 21, a second fluid driving part 23, a third fluid driving part 25, and a fourth fluid driving part 27.

The first fluid driving part 21 may be placed between the supply tank 1 and the activated carbon filtering device 3. The fluid in the supply tank 1 may be moved to the activated carbon filtering device 3 by the first fluid driving part 21.

The second fluid driving part 23 may be placed between the activated carbon filtering device 3 and the ion exchange resin device 5. The fluid, which has passed through the activated carbon filtering device 3, may be moved to the ion exchange resin device 5 by the second fluid driving part 23.

The third fluid driving part 25 may be placed between the ion exchange resin device 5 and the reverse osmotic membrane device 7. The fluid, which has passed through the ion exchange resin device 5, may be moved to the reverse osmotic membrane device 7 by the third fluid driving part 25.

The fourth fluid driving part 27 may be placed between the reverse osmotic membrane device 7 and the hollow fiber membrane device 9. The fluid, which has passed through the reverse osmotic membrane device 7, may be moved to the hollow fiber membrane device 9 by the fourth fluid driving part 27.

The above description has referred to an example in which four fluid driving parts 2 are provided, but the inventive concept is not limited to this example. For example, the number of the fluid driving parts 2 may be one, two, three, five or more. In addition, the disposition of the fluid driving part 2 may be different from that shown in FIG. 2. The fluid driving part 2 may include a plurality of pumps. In the fluid driving part 2, the pumps may be disposed in parallel. This will be described in more detail with reference to FIG. 3.

The control unit C may be configured to control the fluid driving part 2. For example, the control unit C may control the fluid driving part 2, based on pressure information provided from the fluid driving part 2. For this, the control unit C may include a memory device and a processor. The memory device may be an IC chip, which is configured to store programs, instructions, and data that are used for various operations of the fluid driving part 2. The processor may generate control signals, which are used to control the fluid driving part 2, based on the programs, instructions, and data stored in the memory device. The memory and the processor may be mounted on a printed circuit board (PCB) (not shown). The control unit C will be described in more detail below.

The first power supplying part PS1 may provide an electric power to the fluid driving part 2. In an embodiment, the electric power supplied from the first power supplying part PS1 may be used to produce a driving force, which is exerted on the fluid from the fluid driving part 2. The first power supplying part PS1 may be configured to selectively supply an electric power to at least one of the pumps of the fluid driving part 2. This will be described in more detail below.

The second power supplying part PS2 may provide an electric power to the fluid driving part 2. In an embodiment, the electric power supplied from the second power supplying part PS2 may be used to produce a driving force, which is exerted on the fluid from the fluid driving part 2. The second power supplying part PS2 may be configured to supply an electric power to at least one of the remaining pumps of the fluid driving part 2. For example, the second power supplying part PS2 may supply an electric power to the pumps to which the first power supplying part PS1 does not supply an electric power. This will be described in more detail below.

The above description has referred to an example in which two power supplying parts PS1 and PS2 are provided, but the inventive concept is not limited to this example. For example, three or more power supplying parts may be provided in certain embodiments. In an embodiment, four or five power supplying parts may be provided.

Figure 3:
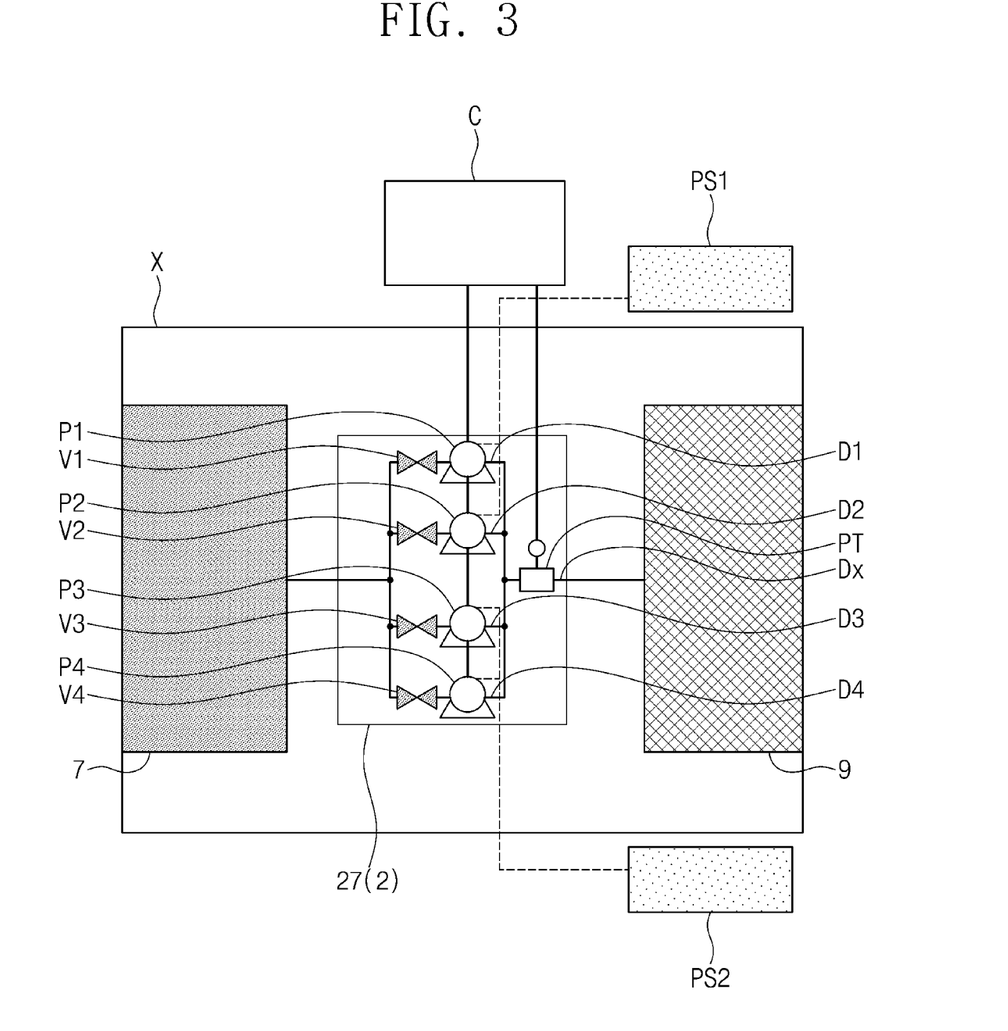
FIG. 3 is an enlarged diagram illustrating a portion 'X' of FIG. 2.

FIG. 3 is an enlarged diagram illustrating a portion 'X' of FIG. 2.

Referring to FIG. 3, the fourth fluid driving part 27 may include a plurality of pumps, a plurality of conduits, a plurality of valves, a connection conduit Dx, and a pressure sensor PT.

The pumps (e.g., P1, P2, and so forth) may be arranged in parallel to each other. The pumps may be arranged in parallel between the reverse osmotic membrane device 7 and the hollow fiber membrane device 9. For example, the pumps may be arranged to be connected in parallel to the reverse osmotic membrane device 7, and the pumps may be arranged to be connected in parallel to the hollow fiber membrane device 9. In an embodiment, the fluid may pass through only one of the pumps when it is supplied from the reverse osmotic membrane device 7 to the hollow fiber membrane device 9. In an embodiment, the number of the pumps may be four. For example, a first pump P1, a second pump P2, a third pump P3, and a fourth pump P4 may be provided, e.g., to the fourth fluid driving part 27. In an embodiment, all of the first, second, third, and fourth pumps P1, P2, P3, and P4 may be provided to have the same size, but the inventive concept is not limited to this example. Since the first, second, third, and fourth pumps P1, P2, P3, and P4 are arranged in a parallel manner, each of the first, second, third, and fourth pumps P1, P2, P3, and P4 may be connected to the reverse osmotic membrane device 7 and the hollow fiber membrane device 9.

The conduits (e.g., D1, D2, and so forth) may be arranged in parallel to each other. Each of the conduits may connect the reverse osmotic membrane device 7 to the hollow fiber membrane device 9. Each of the pumps may be coupled to a corresponding one of the conduits. In an embodiment, the number of the conduits may be four. For example, four conduits may be connected parallel between the reverse osmotic membrane device 77 and the hollow fiber membrane device 9. For example, a first conduit D1, a second conduit D2, a third conduit D3, and a fourth conduit D4 may be provided. The first pump P1 may be placed on and coupled to the first conduit D1. The second pump P2 may be placed on and coupled to the second conduit D2. The third pump P3 may be placed on and coupled to the third conduit D3. The fourth pump P4 may be placed on and coupled to the fourth conduit D4.

Each of the valves (e.g., V1, V2, and so forth), may be placed on a corresponding one of the conduits. Each of the valves may be configured to open or close a corresponding one of the conduits. Accordingly, a flow rate of the fluid flowing through an inner space of each of the conduits may be controlled, e.g., by the valve. In an embodiment, the number of the valves may be four. For example, a first valve V1, a second valve V2, a third valve V3, and a fourth valve V4 may be provided. The first valve V1 may be placed on the first conduit D1. The second valve V2 may be placed on the second conduit D2. The third valve V3 may be placed on the third conduit D3. The fourth valve V4 may be placed on the fourth conduit D4.

The connection conduit Dx may be placed between the pumps and the hollow fiber membrane device 9. The connection conduit Dx may be connected to each of the first, second, third, and fourth conduits D1, D2, D3, and D4. The first, second, third, and fourth conduits D1, D2, D3, and D4 may be connected to each other by the connection conduit Dx. For example, the fluid flowing through the first, second, third, and fourth conduits D1, D2, D3, and D4 may merge into each other in the connection conduit Dx. The connection conduit Dx may connect each of the first, second, third, and fourth conduits D1, D2, D3, and D4 to the hollow fiber membrane device 9.

The pressure sensor PT may be placed between the pumps and the hollow fiber membrane device 9. For example, the pressure sensor PT may be placed on the connection conduit Dx. The pressure sensor PT may be configured to measure a pressure of the fluid in the connection conduit Dx. The pressure sensor PT may include or may be an element that is used to measure a pressure of liquid. For example, the pressure sensor PT may include or may be a piezo sensor using a piezo-electric effect. Information on the pressure measured by the pressure sensor PT may be transmitted to the control unit C. For example, the pressure sensor PT may include a pressure transmitter. The pressure transmitter may be configured to transmit a signal (hereinafter, pressure signal), which contains information on the pressure in the connection conduit Dx, to the control unit C. FIG. 3 illustrates an example in which one pressure sensor PT is placed on only the connection conduit Dx, but the inventive concept is not limited to this example. For example, the pressure sensor PT may be placed on and coupled to each of the first, second, third, and fourth conduits D1, D2, D3, and D4.

The control unit C may control the first, second, third, and fourth pumps P1, P2, P3, and P4. For example, the control unit C may control an on/off operation of each of the first, second, third, and fourth pumps P1, P2, P3, and P4, based on the pressure signal of the connection conduit Dx transmitted from the pressure sensor PT. Alternatively, the control unit C may control an output of each of the first, second, third, and fourth pumps P1, P2, P3, and P4. The control unit C will be described in more detail below.

The first power supplying part PS1 may be connected to the first and second pumps P1 and P2. The first power supplying part PS1 may supply an electric power to each of the first and second pumps P1 and P2. The first power supplying part PS1 may not supply the electric power to the third and fourth pumps P3 and P4.

The second power supplying part PS2 may be connected to the third and fourth pumps P3 and P4. The second power supplying part PS2 may supply an electric power to each of the third and fourth pumps P3 and P4. The second power supplying part PS2 may not supply the electric power to the first and second pumps P1 and P2.

The second power supplying part PS2 may be a separate element distinct from the first power supplying part PS1. For example, the first power supplying part PS1 may be separated from the second power supplying part PS2. Thus, even when one of the first and second power supplying parts PS1 and PS2 malfunctions, the other may be normally operated.

So far, the fourth fluid driving part 27 has been described, but the first fluid driving part 21, the second fluid driving part 23, and the third fluid driving part 25 may be configured to have a structure the same as or similar to the fourth fluid driving part 27.

Figure 4:
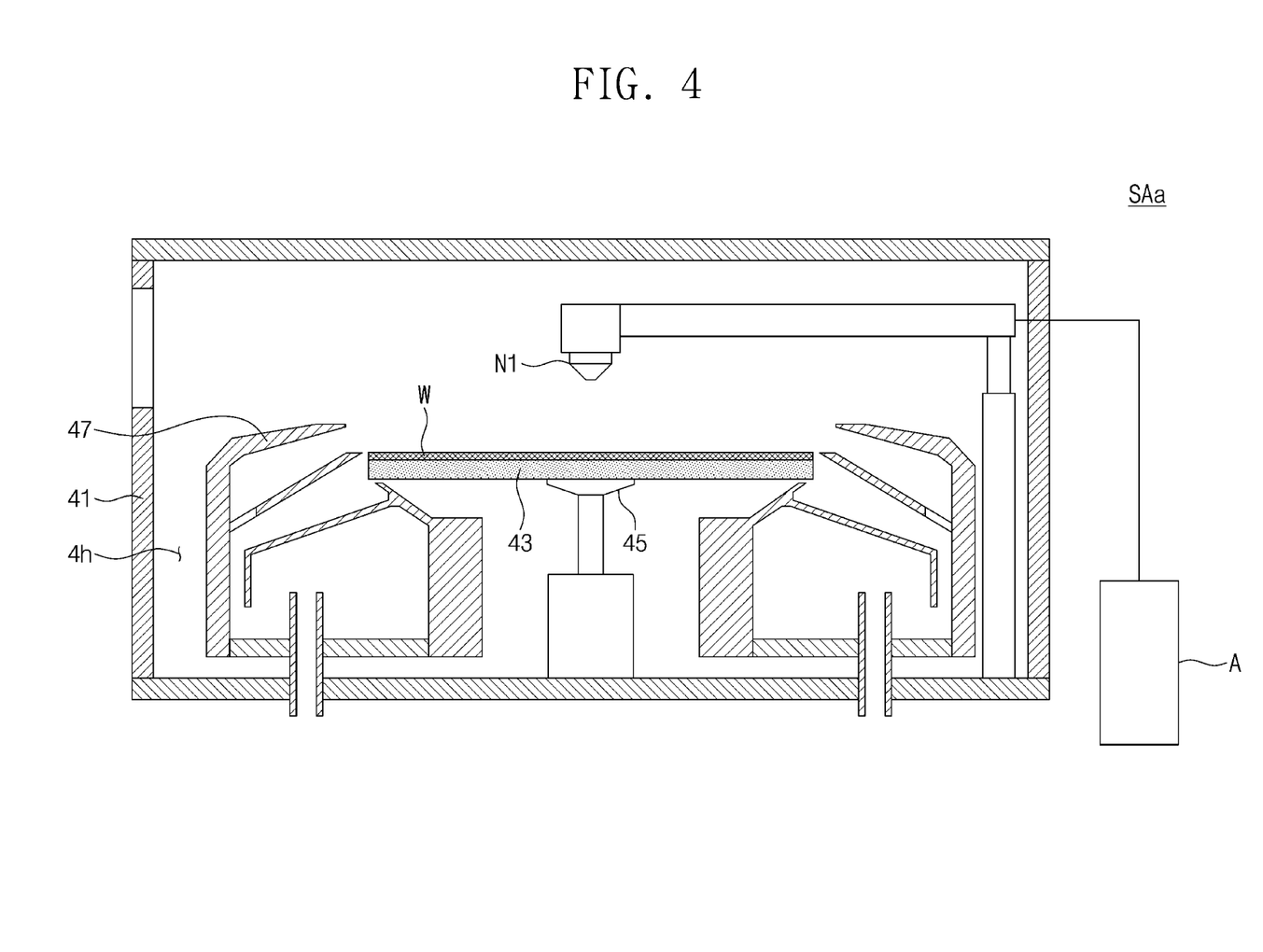
FIG. 4 is a sectional view illustrating a substrate processing device according to an embodiment of the inventive concept.

FIG. 4 is a sectional view illustrating a substrate processing device according to an embodiment of the inventive concept.

Referring to FIG. 4, the substrate processing device SAa may be provided. The substrate processing device SAa may be configured to perform a cleaning process on a substrate W. For example, the substrate processing device SAa may be a substrate cleaning device/apparatus. The substrate processing device SAa may include a cleaning chamber 41, a cleaning stage 43, a rotation driving part 45, a bowl 47, and a cleaning nozzle N1.

The cleaning chamber 41 may have a cleaning space 4h. The cleaning stage 43 may be placed in the cleaning space 4h. The cleaning stage 43 may support the substrate W. The rotation driving part 45 may be configured to rotate the cleaning stage 43. The substrate W disposed on the cleaning stage 43 may be rotated by the rotation driving part 45. The bowl 47 may be provided to surround the cleaning stage 43. The cleaning nozzle N1 may be spaced apart from the cleaning stage 43 in an upward direction. For example, the cleaning nozzle N1 may be placed above the cleaning stage 43. The cleaning nozzle N1 may be connected to the ultrapure water supplying apparatus A. The cleaning nozzle N1 may receive the ultrapure water from the ultrapure water supplying apparatus A. The cleaning nozzle N1 may be configured to spray the ultrapure water onto the substrate W disposed on the cleaning stage 43. As a result of the rotation of the substrate W by the rotation driving part 45, the ultrapure water may be moved toward an edge of the substrate W, and a top surface of the substrate W may be cleaned during this process. For example, the ultrapure water may move toward the edge of the substrate W by a centrifugal force to clean the top surface of the substrate W.

Spatially relative terms, such as "beneath," "below," "lower," "above," "upper" and the like, may be used herein for ease of description to describe positional relationships. It will be understood that the spatially relative terms encompass different orientations of the device in addition to the orientation depicted in the figures.

Figure 5:
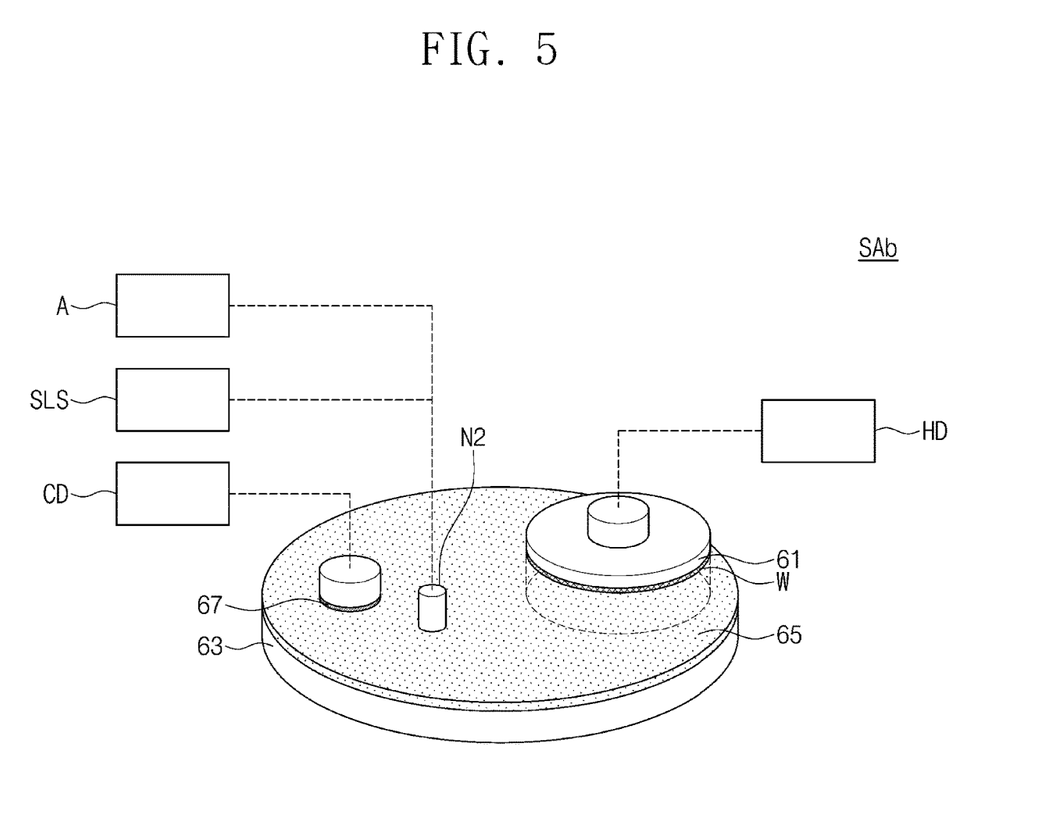
FIG. 5 is a perspective view illustrating a substrate processing device according to an embodiment of the inventive concept.

FIG. 5 is a perspective view illustrating a substrate processing device according to an embodiment of the inventive concept.

Referring to FIG. 5, the substrate processing device SAb may be provided. The substrate processing device SAb may be configured to perform a polishing process on the substrate W. For example, the substrate processing device SAb may be a substrate polishing device/apparatus. The substrate processing device SAb may include a polishing head 61, a polishing stage 63, a polishing pad 65, a conditioning disk 67, a head driving part HD, a conditioning driving part CD, a slurry supplying part SLS, and a polishing nozzle N2.

The polishing head 61 may support the substrate W. The substrate W supported by the polishing head 61 may be polished by the polishing pad 65. The polishing stage 63 may be configured to rotate the polishing pad 65. The polishing pad 65 may be configured to polish a surface of the substrate W while in contact with the substrate W. The conditioning disk 67 may be configured to improve a state of the top surface of the polishing pad 65. For example, the conditioning disk 67 may polish the top surface of the polishing pad 65. The head driving part HD may be configured to rotate, move, transfer, and/or translate the polishing head 61. The conditioning driving part CD may be configured to move the conditioning disk 67. The slurry supplying part SLS may supply a slurry to the polishing nozzle N2. The polishing nozzle N2 may be connected to the slurry supplying part SLS and the ultrapure water supplying apparatus A. The ultrapure water supplying apparatus A may supply the ultrapure water to the polishing nozzle N2. The polishing nozzle N2 may be configured to mix the slurry and the ultrapure water, which are respectively supplied from the slurry supplying part SLS and the ultrapure water supplying apparatus A, and to spray the mixture onto the polishing pad 65.

FIGS. 4 and 5 illustrate examples in which the substrate processing device SA of FIG. 1 is a cleaning apparatus or a polishing apparatus, but the inventive concept is not limited to these examples. For example, the substrate processing device SA may include or may be another apparatus that is configured to perform a substrate processing process using the ultrapure water.

Figure 6:
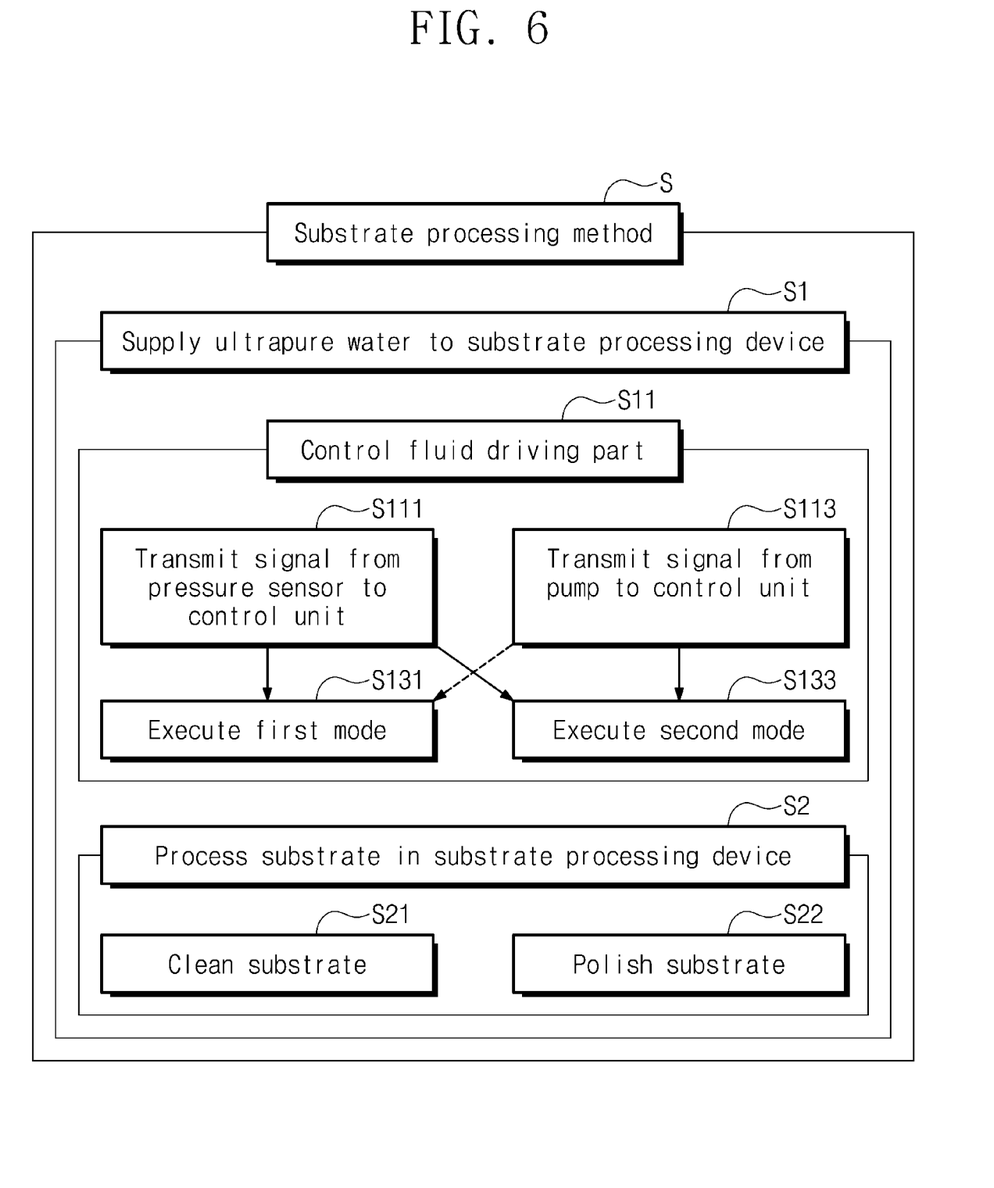
FIG. 6 is a flow chart illustrating a substrate processing method according to an embodiment of the inventive concept.

FIG. 6 is a flow chart illustrating a substrate processing method according to an embodiment of the inventive concept.

Referring to FIG. 6, a substrate processing method S may be provided. The substrate processing method S may be used to treat a substrate using the substrate processing system PS described with reference to FIG. 1. The substrate processing method S may include supplying ultrapure water to a substrate processing device (in S1) and processing a substrate in the substrate processing device (in S2).

The supplying of the ultrapure water to the substrate processing device (in S1) may include controlling a fluid driving part (in S11).

The controlling of the fluid driving part (in S11) may include transmitting a signal from a pressure sensor to a control unit (in S111), transmitting a signal from a pump to the control unit (in S113), executing a first mode (in S131), and executing a second mode (in S133).

The processing of the substrate in the substrate processing device (in S2) may include cleaning the substrate (in S21) or polishing the substrate (in S22).

Hereinafter, the substrate processing method S of FIG. 6 will be described in more detail with reference to FIGS. 7 to 9.

Figure 7:
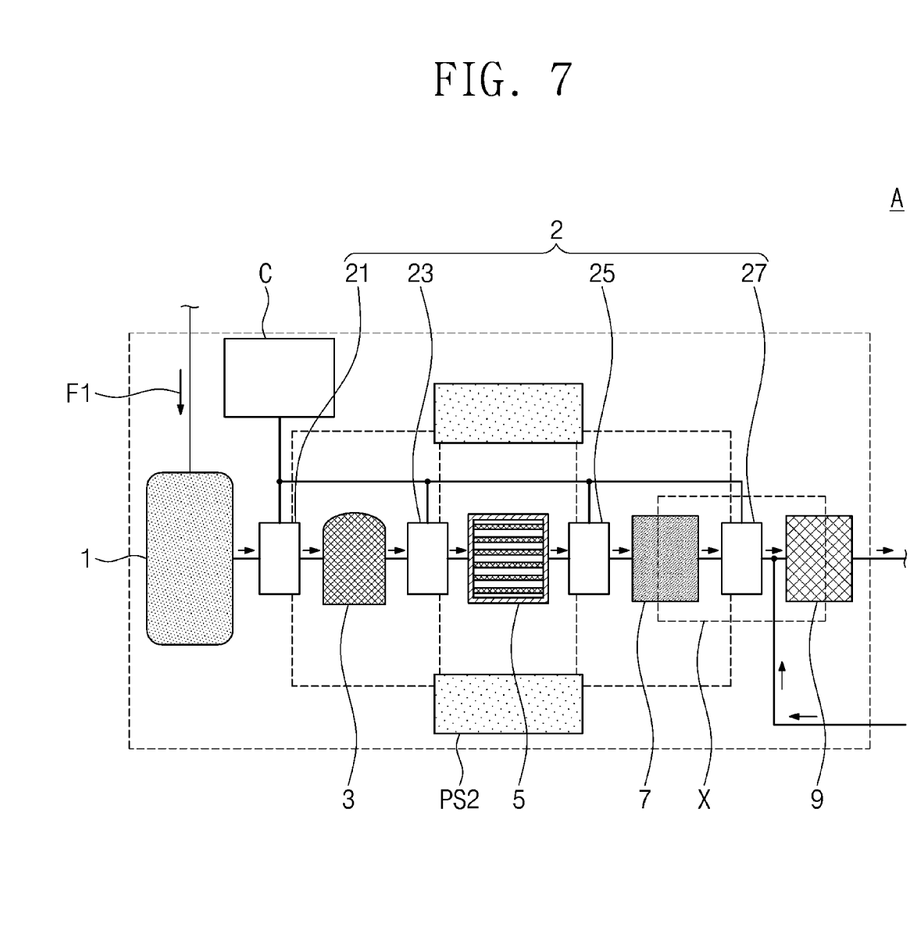
FIGS. 7 to 9 are diagrams sequentially illustrating steps of the substrate processing method according to the flow chart of FIG. 6.
Figure 8:
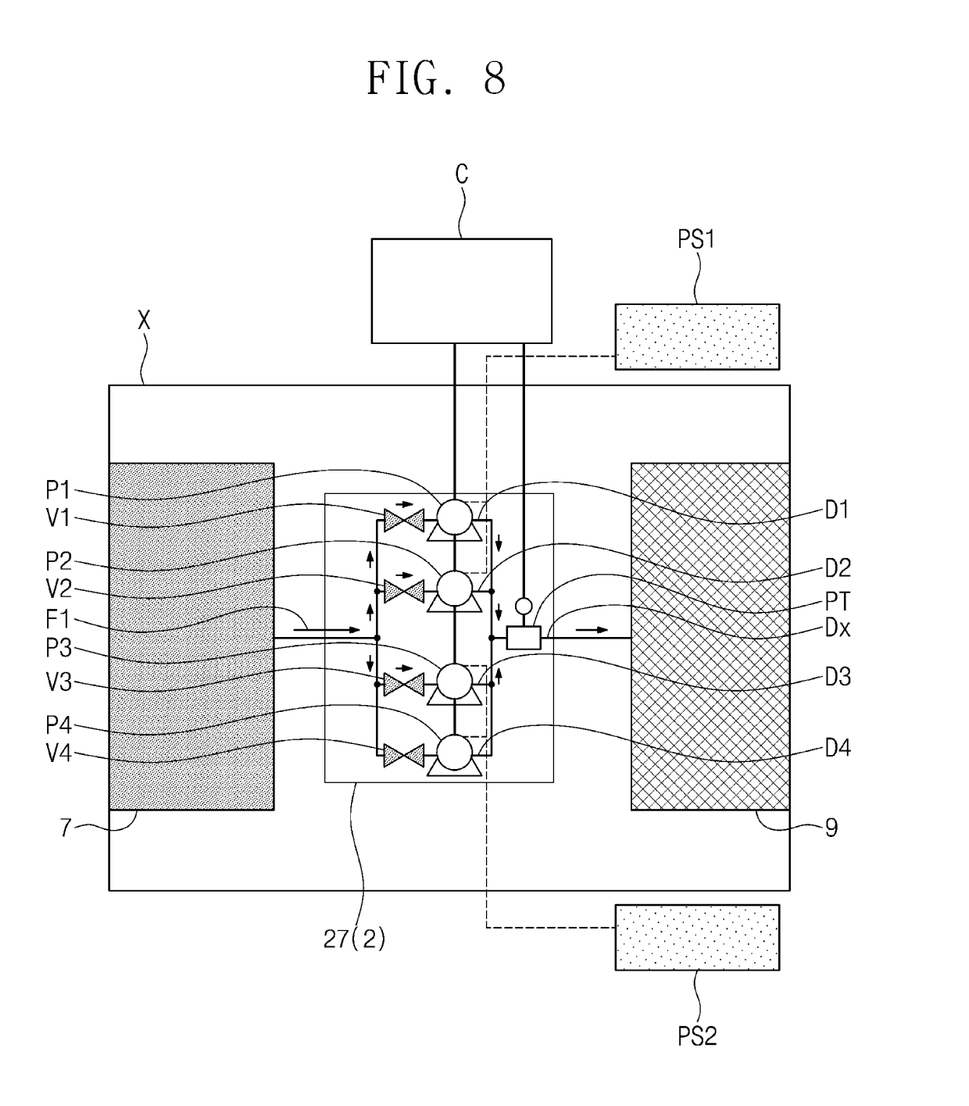
Figure 9:
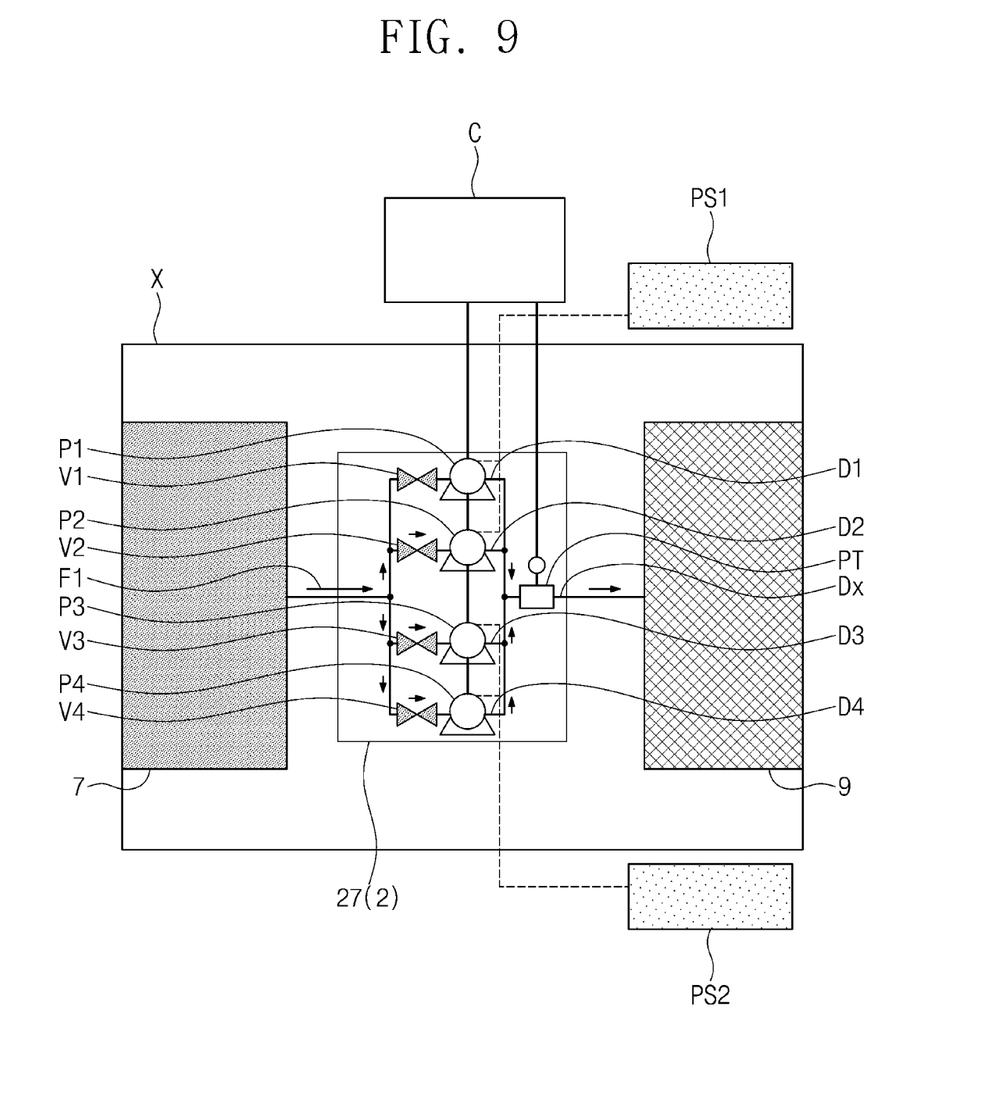

FIGS. 7 to 9 are diagrams sequentially illustrating steps of the substrate processing method according to the flow chart of FIG. 6.

Referring to FIGS. 7 and 6, the supplying of the ultrapure water to the substrate processing device (in S1) may include pressing a fluid F1 to pass through the supply tank 1, the activated carbon filtering device 3, the ion exchange resin device 5, the reverse osmotic membrane device 7, and the hollow fiber membrane device 9 sequentially. The fluid F1, which has sequentially passed through the devices 1, 3, 5, 7, and 9, may be filtered to form the ultrapure water. This process may be executed by controlling the fluid driving part (in S11).

Referring to FIG. 8, the first pump P1, the second pump P2, and the third pump P3 may be operated by the control unit C. Meanwhile, the control unit C may not operate the fourth pump P4. This state may be referred to as the first mode. The fourth pump P4, which is not operated in the first mode, may be a backup pump.

Referring to FIG. 9, the second pump P2, the third pump P3, and the fourth pump P4 may be operated by the control unit C. Meanwhile, the control unit C may not operate the first pump P1. This state may be referred to as the second mode. For example, the backup pump may be operated in the second mode.

Referring back to FIGS. 8 and 6, the transmitting of the signal from the pressure sensor to the control unit (in S111) may include transmitting a signal, which contains information on the pressure of the fluid in the connection conduit Dx, from the pressure sensor PT to the control unit C. In the case where an internal pressure of the connection conduit Dx is not lower than a reference pressure, the pressure sensor PT may transmit a normal signal to the control unit C. In this case, under the control of the control unit C, the fluid driving part 2 may be operated in the first mode. For example, if the normal signal is transmitted, the control unit C may control the fluid driving part 2 such that the fluid driving part 2 is operated in the first mode (in S131). The control unit C may not operate the backup pump.

Referring to FIGS. 9 and 6, in the case where an internal pressure of the connection conduit Dx is lower than the reference pressure, the pressure sensor PT may transmit an abnormal signal to the control unit C. In this case, under the control of the control unit C, the fluid driving part 2 may be operated in the second mode. For example, if the abnormal signal is transmitted, the control unit C may control the fluid driving part 2 such that the fluid driving part 2 is operated in the second mode (in S133). The presence of the abnormal signal may indicate that at least one of the first, second, or third pump P1, P2, or P3 malfunctions. In this case, the backup pump may be operated under the control of the control unit C. Accordingly, the internal pressure of the connection conduit Dx may be recovered to a specific level. Thus, the flow rate of the ultrapure water supplied by the ultrapure water supplying apparatus A may be maintained to a specific level or higher.

Referring back to FIG. 6, the transmitting of the signal from the pump to the control unit (in S113) may include or may be transmitting a signal from each of the pumps to the control unit C. Each of the pumps may send a signal, which contains information on an operation state thereof, to the control unit C. If a signal transmitted from the first, second, or third pump P1, P2, or P3 indicates that the first, second, or third pump P1, P2, or P3 is not operated during the first mode, the operation may be switched to the second mode, under the control of the control unit C. Accordingly, the internal pressure of the connection conduit Dx may be recovered to a specific level (e.g., to a normal level). Thus, the flow rate of the ultrapure water supplied by the ultrapure water supplying apparatus A may be maintained to a specific level or higher (e.g., within a normal range of level). Here, the control unit C may interrupt an electric power supplied to a malfunctioned pump. For example, if the first pump P1 does not work, the control unit C may interrupt an electric power supplied to the first pump P1. Alternatively, the control unit C may close the first valve V1 to stop the operation of the first pump P1. In this case, the fluid F1 may not be supplied to the first pump P1. The fluid F1 may flow through only the second, third, and fourth pumps P2, P3, and P4. The above description has referred to an example in which the valve, such as the first valve V1, is automatically opened and closed by the control of the control unit C, but the inventive concept is not limited to this example. For example, the valve, such as the first valve V1, includes a passive valve, an open/close operation of the valve may be manually performed.

In an ultrapure water supplying apparatus according to an embodiment of the inventive concept, a substrate processing system including the same, and a substrate processing method using the same, a plurality of pumps may be disposed in parallel on a path for supplying the ultrapure water. Thus, even when at least one of the pumps has a problem, a total flow rate may be managed to a specific level (e.g., be maintained within a normal range of level). This may be beneficial to stably supply the ultrapure water to the substrate processing device and thereby to increase a yield in a fabrication process on a substrate.

In an ultrapure water supplying apparatus according to an embodiment of the inventive concept, a substrate processing system including the same, and a substrate processing method using the same, a backup pump may be operated when an undesired lowering of a total pressure is sensed by a pressure sensor. For example, if one of the pumps in a first mode is abnormally operated or malfunctions, the pressure may be lowered. In this case, the lowering of the pressure may be sensed by the pressure sensor, and the backup pump may be operated by the control unit. This may be beneficial to supply the ultrapure water at a desired flow rate or higher.

In an ultrapure water supplying apparatus according to an embodiment of the inventive concept, a substrate processing system including the same, and a substrate processing method using the same, a plurality of power supplying parts may be used to supply an electric power to each of the pumps which are disposed in parallel. Thus, even when one of the power supplying parts has a problem, the others of the power supplying parts may be used to operate the pumps. This may be beneficial to prevent the ultrapure water, which is supplied to the substrate processing device, from being interrupted.

In an ultrapure water supplying apparatus according to an embodiment of the inventive concept, a substrate processing system including the same, and a substrate processing method using the same, it may be possible to stably supply ultrapure water at a specific flow rate or higher.

In an ultrapure water supplying apparatus according to an embodiment of the inventive concept, a substrate processing system including the same, and a substrate processing method using the same, it may be possible to prepare for technical issues which may occur when at least one of pumps malfunctions.

In an ultrapure water supplying apparatus according to an embodiment of the inventive concept, a substrate processing system including the same, and a substrate processing method using the same, it may be possible to prepare for technical issues which may occur when a power supplying part malfunctions.

While example embodiments of the inventive concept have been particularly shown and described, it will be understood by one of ordinary skill in the art that variations in form and detail may be made therein without departing from the spirit and scope of the attached claims.

What is claimed is:

1. An ultrapure water supplying apparatus, comprising:
    an activated carbon filtering device having an inlet for connection to a water an ion exchange resin device connected to the activated carbon filtering device;
    a reverse osmotic membrane device connected to the ion exchange resin device;
    a hollow fiber membrane device connected to the reverse osmotic membrane supply; device, the hollow fiber membrane device having an outlet for supplying ultrapure water generated from the water supply by the ultrapure water supplying apparatus by passing water through the activated carbon filtering device, the ion exchange resin device, the reverse osmotic membrane device, and the hollow fiber membrane device;
    a first fluid driving part between the reverse osmotic membrane device and the hollow fiber membrane device; and
    a control unit configured to control the first fluid driving part,
    wherein the first fluid driving part comprises:

a first pump connected between the reverse osmotic membrane device and the hollow fiber membrane device;

a second pump connected between the reverse osmotic membrane device and the hollow fiber membrane device, and the second pump configured in parallel with the first pump;

a third pump connected between the reverse osmotic membrane device and the hollow fiber membrane device, and the third pump configured in parallel with each of the first and second pumps; and a pressure sensor located between the first pump and the hollow fiber membrane device and configured to output a signal based on a pressure between the first pump and the hollow fiber membrane device, wherein the control unit is configured to control each of the first, second, and third pumps, to switch an operation of the first fluid driving part between the first pump and the third pump based on the signal transmitted from the pressure sensor.

2. The ultrapure water supplying apparatus of claim 1, wherein the first fluid driving part comprises:
a first conduit coupled to the first pump;
a second conduit coupled to the second pump;
a third conduit coupled to the third pump; and
a connection conduit connected to each of the first, second, and third conduits to connect each of the first, second, and third conduits to the hollow fiber membrane device,
wherein the pressure sensor is placed on the connection conduit.

3. The ultrapure water supplying apparatus of claim 2, wherein the pressure sensor is configured to generate an abnormal signal in response to a pressure in the connection conduit is lower than a reference pressure, and the control unit is configured to sense an abnormality based on the abnormal signal and switch operation of the first fluid driving part between the first pump and the second pump, and the second pump and the third pump in response to the abnormality.

4. The ultrapure water supplying apparatus of claim 3, wherein the control unit is configured to selectively switch between:
a first mode of operating the first and second pumps but not the third pump; and
a second mode of operating the third pump but not the first pump.

5. The ultrapure water supplying apparatus of claim 4, wherein the control unit is configured to switch to the second mode in response to the pressure sensor transmitting the abnormal signal to the control unit.

6. The ultrapure water supplying apparatus of claim 1, further comprising:
a first power supplying part connected to the first fluid driving part; and
a second power supplying part connected to the first fluid driving part and separated from the first power supplying part,
wherein the first fluid driving part further comprises a fourth pump, which is connected to the reverse osmotic membrane device and is configured in parallel to each of the first, second, and third pumps,
the first power supplying part is connected to the first and second pumps to supply an electric power to the first and second pumps, the second power supplying part is connected to the third and fourth pumps to supply an electric power to the third and fourth pumps, and
the control unit switches the operation of the first fluid driving part between the first pump and the third pump by selectively powering one of the first power supplying part and the second power supplying part.

7. The ultrapure water supplying apparatus of claim 1, further comprising:
a second fluid driving part between the activated carbon filtering device and the ion exchange resin device; and
a third fluid driving part between the ion exchange resin device and the reverse osmotic membrane device,
the second fluid driving part comprises a plurality of pumps which are arranged in parallel, and
the third fluid driving part comprises a plurality of pumps which are arranged in parallel.

8. A substrate processing system, comprising:
a substrate processing device; and
an ultrapure water supplying apparatus configured to supply ultrapure water to the substrate processing device,
wherein the ultrapure water supplying apparatus comprises:
a first filtering device having an inlet configured to receive water;
a second filtering device connected to the first filtering device, the second filtering device having an outlet configured to output filtered water that has passed through the first filtering device and the second filtering device;
a fluid driving part the first and second filtering devices;
a first power supplying part connected to the fluid driving part; and
a second power supplying part connected to the fluid driving part and separated from the first power supplying part,
wherein the fluid driving part comprises:
a first pump connected between the first filtering device and the second filtering device, the first pump configured to receive electric power from the first power supplying part and to drive fluid from the first filtering device to the second filtering device;
a second pump connected between the first filtering device and the second filtering device, the second pump configured to receive electric power from the second power supplying part and to drive fluid through the second filtering device, the first and second pumps being configured in parallel with one another;
a pressure sensor located between the first pump and the second filtering device; and
a control unit configured to control each of the first power supply and the second power supply to selectively switch electrical power between the first pump and the second pump to selectively switch between the first pump and the second pump to drive fluid through the second filtering device based on a signal received from the pressure sensor.

9. The substrate processing system of claim 8, wherein each of the first and second filtering devices comprises an activated carbon filtering device, an ion exchange resin device, a reverse osmotic membrane device, or a hollow fiber membrane device.

10. The substrate processing system of claim 8, wherein the fluid driving part comprises:
a first conduit coupled to the first pump;

a second conduit coupled to the second pump; and
a connection conduit connected to each of the first and second conduits to connect each of the first and second conduits to the second filtering device,
wherein the pressure sensor is configured to measure the pressure in the connection conduit.

11. The substrate processing system of claim 10, wherein the pressure sensor is configured to transmit an abnormal signal to the control unit in response to the pressure in the connection conduit being lower than a reference pressure, and
the control unit is configured to switch electrical power to the second pump in response to the abnormal signal from the pressure sensor being transmitted to the control unit.

12. The substrate processing system of claim 8, wherein the substrate processing device comprises a substrate cleaning device or a substrate polishing device.

13. The substrate processing system of claim 8, further comprising:
a supply conduit connecting the substrate processing device to the ultrapure water supplying apparatus;
a flow control device on the supply conduit; and
a collecting conduit, which connects the flow control device to the ultrapure water supplying apparatus and is provided as an element distinct from the supply conduit.

14. A substrate processing method, comprising:
supplying ultrapure water to a substrate processing device using an ultrapure water supplying apparatus; and
processing a substrate in the substrate processing device using the ultrapure water,
wherein the supplying of the ultrapure water to the substrate processing device using the ultrapure water supplying apparatus comprises controlling a fluid driving part under control of a control unit such that a fluid passes through an activated carbon filtering device, an ion exchange resin device, a reverse osmotic membrane device, and a hollow fiber membrane device of the ultrapure water supplying apparatus sequentially, thereby generating ultrapure water from the fluid,
wherein the fluid driving part comprises:
a plurality of pumps, which are arranged in parallel between the reverse osmotic membrane device and the hollow fiber membrane device; and
a pressure sensor located between the plurality of pumps and the hollow fiber membrane device,
wherein the controlling of the fluid driving part comprises switching between a first pump of the plurality of pumps to drive fluid through the hollow fiber membrane device and a second pump of the plurality of pumps to drive fluid through the hollow fiber membrane device in response to an abnormal signal transmitted from the pressure sensor to the control unit, wherein the abnormal signal is indicative of a pressure falling below a reference pressure.

15. The substrate processing method of claim 14, wherein the fluid driving part comprises:
a plurality of conduits coupled to the pumps, respectively; and
a connection conduit connecting each of the conduits to the hollow fiber membrane device,
wherein the pressure sensor is placed on the connection conduit.

16. The substrate processing method of claim 15, wherein the controlling of the fluid driving part comprises:
executing a first mode, in which a backup pump, one of the pumps, is not operated, under control of the control unit; and
ending the execution of the first mode and switching to executing a second mode, in which the backup pump is operated, under control of the control unit, when the abnormal signal is transmitted to the control unit.

17. The substrate processing method of claim 14, wherein the ultrapure water supplying apparatus comprises:
a first power supplying part, which is connected to at least one of the pumps to supply an electric power thereto; and
a second power supplying part, which is connected to at least one of the pumps other than the pumps connected to the first power supplying part to supply an electric power thereto.

18. The substrate processing method of claim 17, wherein the controlling of the fluid driving part further comprises transmitting a signal, which contains information on an operation state of each of the pumps, from each of the pumps to the control unit.

19. The substrate processing method of claim 14, wherein the processing of the substrate in the substrate processing device comprises:
spraying the ultrapure water on the substrate to clean the substrate; or
spraying the ultrapure water and a slurry on the substrate to polish the substrate.

20. The ultrapure water supplying apparatus of claim 1, wherein
the ion exchange resin device is between the activated carbon filtering device and the reverse osmotic membrane device; and
the reverse osmotic membrane device is between the ion exchange resin device and the hollow fiber membrane device.

* * * * *